(12) United States Patent  
Ellams

(10) Patent No.: US 6,734,637 B2
(45) Date of Patent: May 11, 2004

(54) HOT-RESTRIKE IGNITION SYSTEM FOR A HIGH-FREQUENCY HIGH-INTENSITY DISCHARGE LAMP ASSEMBLY

(75) Inventor: Philip Ellams, Manchester (GB)

(73) Assignee: Power Gems Limited, Manchester (GB)

( * ) Notice: Subject to any disclaimer, the term of this patent is extended or adjusted under 35 U.S.C. 154(b) by 0 days.

(21) Appl. No.: 10/056,580

(22) Filed: Jan. 25, 2002

(65) Prior Publication Data

US 2002/0121866 A1 Sep. 5, 2002

(30) Foreign Application Priority Data

Jan. 25, 2001 (GB) .............................. 0101956

(51) Int. Cl.[7] .............................................. H05B 37/02
(52) U.S. Cl. .................. 315/224; 315/244; 315/276; 315/277; 315/283; 315/289; 315/291
(58) Field of Search .............................. 315/200 R, 206, 315/219, 220, 224, 209 CD, 240, 244, 276, 277, 283, 289, 291, 307, 362, DIG. 2, DIG. 5, DIG. 7

(56) References Cited

U.S. PATENT DOCUMENTS

| 4,167,689 A | * | 9/1979 | Quirke | 315/206 |
| 4,795,945 A | * | 1/1989 | Mayer | 315/276 |
| 6,091,208 A | * | 7/2000 | Flory, IV | 315/290 |
| 6,124,682 A | | 9/2000 | Lakin et al. | 315/291 |

FOREIGN PATENT DOCUMENTS

| GB | 1570927 | 7/1980 |
| GB | 2251139 | 6/1992 |
| WO | WO 00/45622 | 8/2000 |

* cited by examiner

Primary Examiner—James Clinger
Assistant Examiner—Thuy Vinh Tran
(74) Attorney, Agent, or Firm—Hodgson Russ LLP

(57) ABSTRACT

A hot-restrike ignition system for a high-frequency high-intensity discharge lamp includes a resonant circuit that is connectable across the lamp in parallel with a ballast circuit that is used to provide steady-state current for the lamp. The resonant circuit is temporarily energizable for producing a voltage sufficiently high for hot-restrike ignition of the lamp. The resonant circuit has two parts. The first part provides a voltage waveform with frequency approximating the steady-state voltage frequency and amplitude sufficient when combined with the steady-state voltage to produce glow discharge, and the second part provides a voltage waveform that is lower in repetition rate but of sufficiently high voltage to initiate hot-restrike ignition in the lamp.

21 Claims, 9 Drawing Sheets

FREQUENCY TYPICALLY 300-400kHz

HOT-RESTRIKE IGNITION SYSTEM FOR A HIGH-FREQUENCY HIGH-INTENSITY DISCHARGE LAMP ASSEMBLY

BACKGROUND OF THE INVENTION

The invention relates to a high-frequency (HF) high-intensity discharge (HID) lamp assembly, more particularly to a hot-restrike ignition system for such lamp assembly Discharge lamps operate with current limited by a ballast. There are various types of ballasts. At one end is the simple conventional ballast inductor used in neon lights at power-line frequency. At the other end are the electronic ballasts, in which semiconductors are used to control lamp current. The control elements in electronic ballasts operate at a much higher frequency than is the case with conventional ballasts, and the output frequency of electronic ballasts may be controlled independently from the current regulating stage of the ballast.

Electronic ballasts are commonly used for location-lighting in filming environments, where the current regulator operates at a high frequency, say 25 kHz, and the output frequency of the ballast is low, say 100 Hz, This is achieved by passing the regulated current through a low-frequency inverter. Such lamps typically operate at power levels anywhere between 200 watts and 18 kwatts. More information on the difference between conventional magnetic ballasts and electronic ballasts can be found in Chapter 5 of "Philips' Medium Source High Intensity Discharge Lamps: Information for Luminaire and Ballast Manufacturers", published by Philips Lighting BV, Belgium, March 2000.

Some electronic ballasts drive the lamp of a lamp assembly at high frequency. This gives the advantage of a simple power stage because a low-frequency output inverter is not required. However, operation in this manner is generally limited to low-power lamps because of the problem of "acoustic resonance" (see Section 5.2 of the above Philips reference), In order to avoid acoustic resonances, the driving frequency must be above the highest resonant frequency of the lamp. It is lamp assemblies operating at these higher frequencies that are the subject of this invention.

FIG. 1, which is taken from Section 4.1 of the above Philips reference, illustrates the different phases between the moment of switching on the supply power and stable lamp operation for a HID lamp. A successful ignition operation proceeds through all of the voltage-versus-time phases illustrated in FIG. 1, while an unsuccessful ignition results when the process stops in one of those phases. The time scale in FIG. 1 is logarithmic so as to better illustrate the times involved.

The phases in FIG. 1 are: (a) ignition delay, (b) breakdown, (c) take-over, (d) glow, (e) glow-to-arc transition, (f) run-up (arc) phase, and (g) stable operation. The stable operation phase after ignition corresponds to that in which "steady-state voltage" and "steady-state current" operate, as those terms are further used in this document.

Ignitor circuits presently in use with hot-strike-ignition high-intensity-discharge lamps are normally connected in series with the power circuitry that creates the steady-state current for the lamps. With a lamp assembly operating at the high frequency used with the subject invention, however, such a series connection is impractical due to the high heating and high impedance that would be added to the circuit. So the ignitor circuit of the invention is instead connected in parallel with the power circuit.

Reliable ignition of HID lamps is of crucial importance for location lighting in the film industry since filming cannot proceed without proper and sufficient lighting. Any resting delay has a significant cost implication. When HID lamps are hot, they become very difficult to ignite since the required ignition voltage becomes higher. This is the so-called "hot-restrike" condition There is reference to such hot-restrike ignition capability in the patent literature. For instance, WIPO Patent Publication WO 97/43875 refers to a "hot restrike condition" with regard to a metal halide lamp. However, the voltage required for hot-restrike ignition of the lamp in that reference is considerably below that required by a metal halide lamp used for location lighting in the film industry, where lamps typically operate at a power level above one-half kilowatt,

SUMMARY OF THE INVENTION

It would therefore be an advantage to be able to hot-strike-ignite high-intensity discharge lamps of the type used for location lighting and which operate from a high-frequency ballast. It would be a further advantage to be able to ignite such a lamp quickly, avoiding costly down-time, while also reducing the size, weight and complexity of such a lamp as much as possible.

One aspect of the invention is a hot-restrike ignition system for a high-frequency high-intensity discharge lamp assembly. The assembly includes resonance means connectable across a lamp of the lamp assembly in parallel with a ballast circuit of the lamp assembly and which is temporarily energizable for producing a voltage sufficiently high for hot-restrike ignition of the lamp.

Preferably, the lamp assembly includes a ballast circuit for producing a steady-state alternating current for a lamp of the lamp assembly, and the resonance means is a resonant circuit means connectable across the lamp so as to extend in parallel with the ballast circuit, the resonant circuit means being temporarily energizable by energizing means.

The resonant circuit means may comprise one resonant circuit for producing an alternating voltage of higher voltage than a steady-state alternating voltage, and another resonant circuit for producing voltage spikes on the higher voltage. The one resonant circuit may comprise, in serial connection, a pair of coils and a capacitor means therebetween. The other resonant circuit may comprise, in serial connection, another coil, another capacitor means, and a spark gap means.

The pair of coils and the capacitor means may form a secondary circuit of a transformer means, with the other coil forming a primary winding of the transformer means.

A first connection switch may be positioned between one of the pair of coils and the capacitor means, closing of the first connection switch energizing the one resonant circuit.

The one resonant circuit may have a resonant frequency along with multiples and sub-multiples of that frequency, and that resonant frequency may approximate a natural open-circuit frequency of the ballast. The frequency of the steady-state alternating current may be in the range of between 300 kHz and 400 kHz. The spark gap means may discharge approximately every two milliseconds, each time creating a signal with a voltage spike followed by a declining amplitude and having a resonant frequency of approximately 15 MHz.

The one resonant circuit of the transformer means may produce an alternating voltage additive to the steady-state alternating voltage, a resulting total voltage amplitude of the one resonant circuit being at least twice that of the steady-state alternating voltage. The amplitude of the steady-state voltage may be approximately 150V, and the resulting total voltage amplitude at least 300V. Each voltage spike in the other resonant circuit may result in a corresponding voltage spike of approximately 25 kV amplitude in the one resonant circuit, Energizing circuitry connected to the another resonant circuit may include a half-bridge rectifier, wherein one node of the rectifier is connected to a supply neutral through a second connection switch when the energizing circuitry is energized.

Another aspect of the invention is a hot-restrike ignition system for a high-frequency high-intensity discharge lamp assembly, the ignition system comprising a resonant circuit means and an energizing means. The resonant circuit means is in parallel with a ballast circuit that produces steady-state current in a lamp of the lamp assembly. The resonant circuit means comprises a transformer having a primary circuit and a secondary circuit. The secondary circuit comprises: a secondary winding of the transformer, the secondary winding having first and second portions with substantially equal number of turns; a secondary capacitor means positioned between the first and second portions of the secondary winding so as to be in serial connection therewith; and, a first connection switch positioned between the secondary capacitor means and one of the first and second portions of the secondary winding. The primary circuit comprises: a primary winding of the transformer, the primary winding being in serial connection with a primary capacitor means and a spark gap for producing a superimposed voltage wave-form on the secondary winding, the superimposed voltage waveform being of higher voltage and lower repetition rate than that produced by the secondary circuit; and, energizing means for temporarily energizing the primary and secondary circuits.

The primary winding of the transformer may be an output end of a circuit having as an input end a half-bridge rectifier, the rectifier being connected to a supply neutral through a second connection switch.

The first and second connection switches may be connected so as to open together and close together.

The invention is also a lamp assembly that includes the hot-restrike ignition system described above.

Preferred features of the present invention will now be described, by way of example only, with reference to the accompanying drawings, in which:

DETAILED DESCRIPTION OF THE INVENTION

Figure 2:
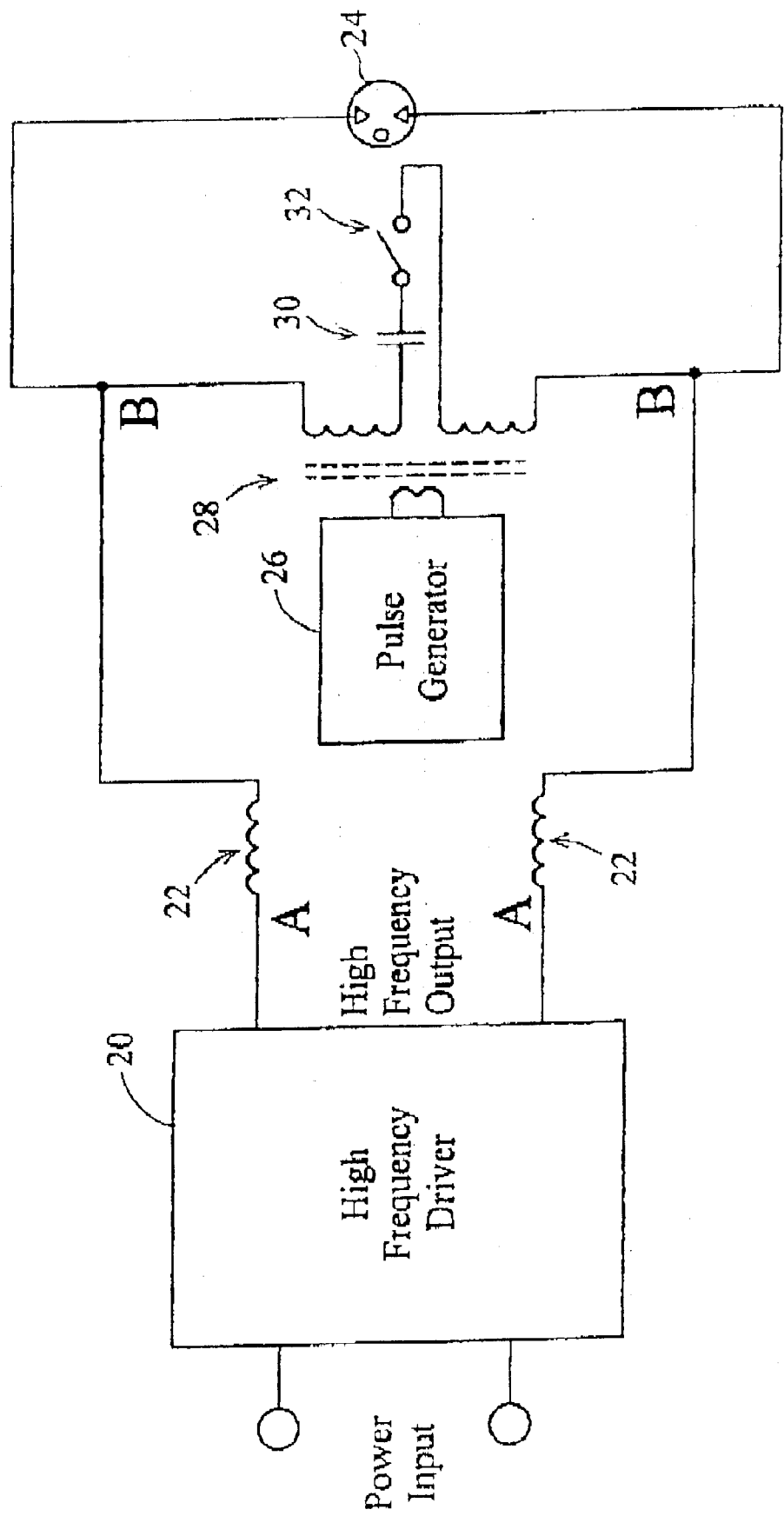
FIG. 2 is a block diagram of a preferred embodiment of the lamp assembly.

In the block diagram of FIG. 2, a standard mains supply 50/60 Hz power input is fed into a high-frequency driver circuit 20 to create a 300V Peak-to-Peak output voltage waveform with a typical frequency between 300 and 400 KHz. The pair of inductors 22 act as a ballast of the lamp assembly and are sized to limit the current flow through lamp 24 during steady-state operating conditions, i.e. not during an ignition period. The ignition circuit of the subject invention extends between the two points marked "B" in FIG. 2, and generally includes a pulse generator 26, a Tesla coil 28, a capacitor 30 and a connection switch 32 each intermediately positioned between, and serially connected with, two halves of the secondary winding of Tesla coil 28.

Figure 3:
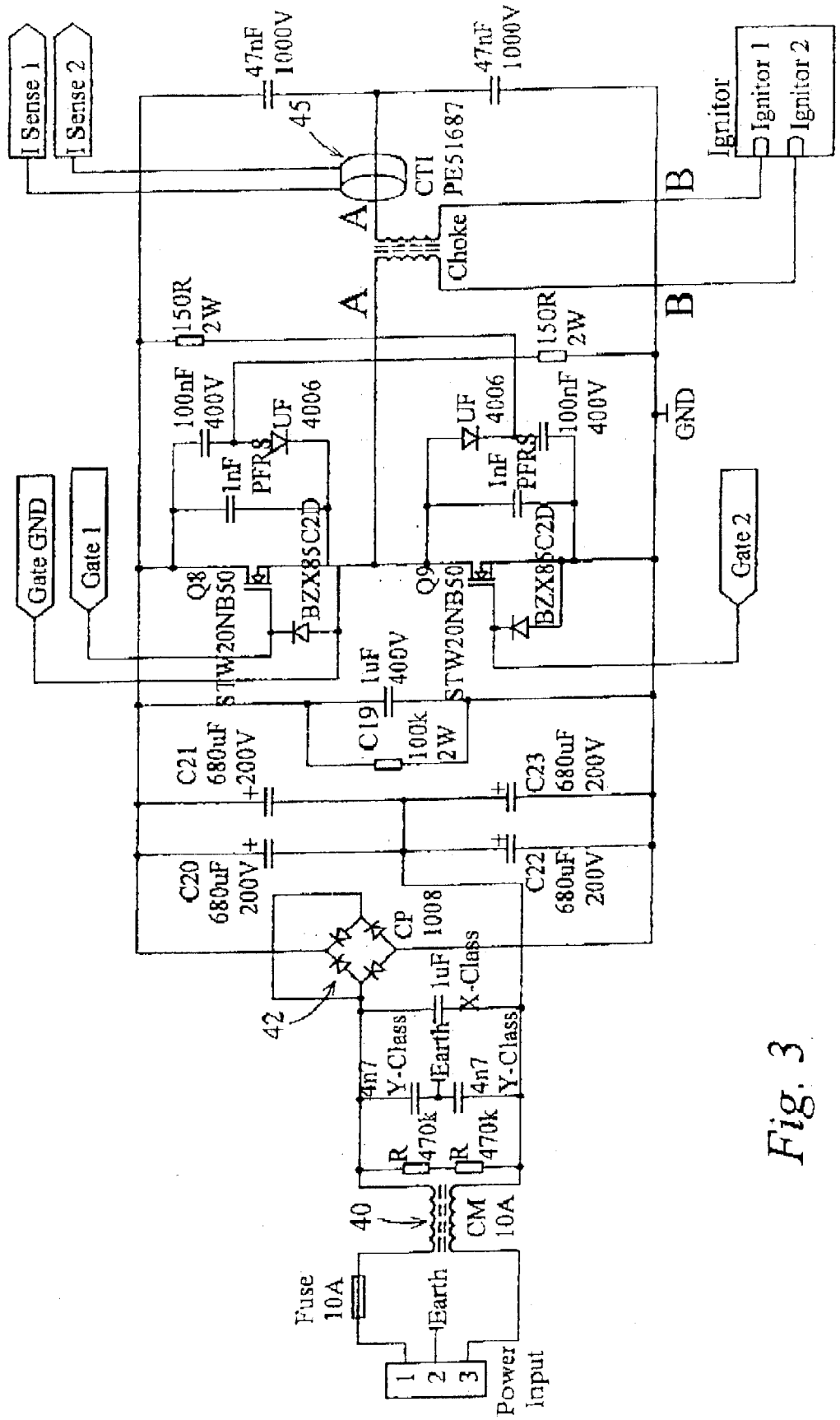
FIG. 3 is a schematic of the ballast power circuit of the preferred embodiment of the lamp assembly.

A schematic of the high-frequency driver circuit 20 is shown in FIG. 3. Power input passes through a common-mode choke 40 in order to reduce electromagnetic interference, and is then fed through a half-bridge rectifier 42. Capacitors C19 to C23 smooth the voltage output, producing a voltage waveform represented by the square 150V waveform of FIG. 7(a). This AC voltage passes across the pair of capacitors C28 and C29, and is sensed by a current sensor 45 which measures the current level. The current sensed by sensor 45 forms an alternating input to the ballast control circuit of FIG. 4, as discussed below. The ballast control circuit uses that input, once rectified by diodes D6 to D9, as a control signal in producing the respective Gate 1 and Gate 2 outputs that control the ON/OFF state of the transistors Q8 and Q9 in FIG. 3. The GND symbol in FIG. 3 represents a floating ground voltage connected to the GND symbols in FIG. 4. The block marked "Ignitor" in the lower right of FIG. 3 is the ignitor circuit illustrated in FIG. 6 and discussed subsequently.

Figure 4:
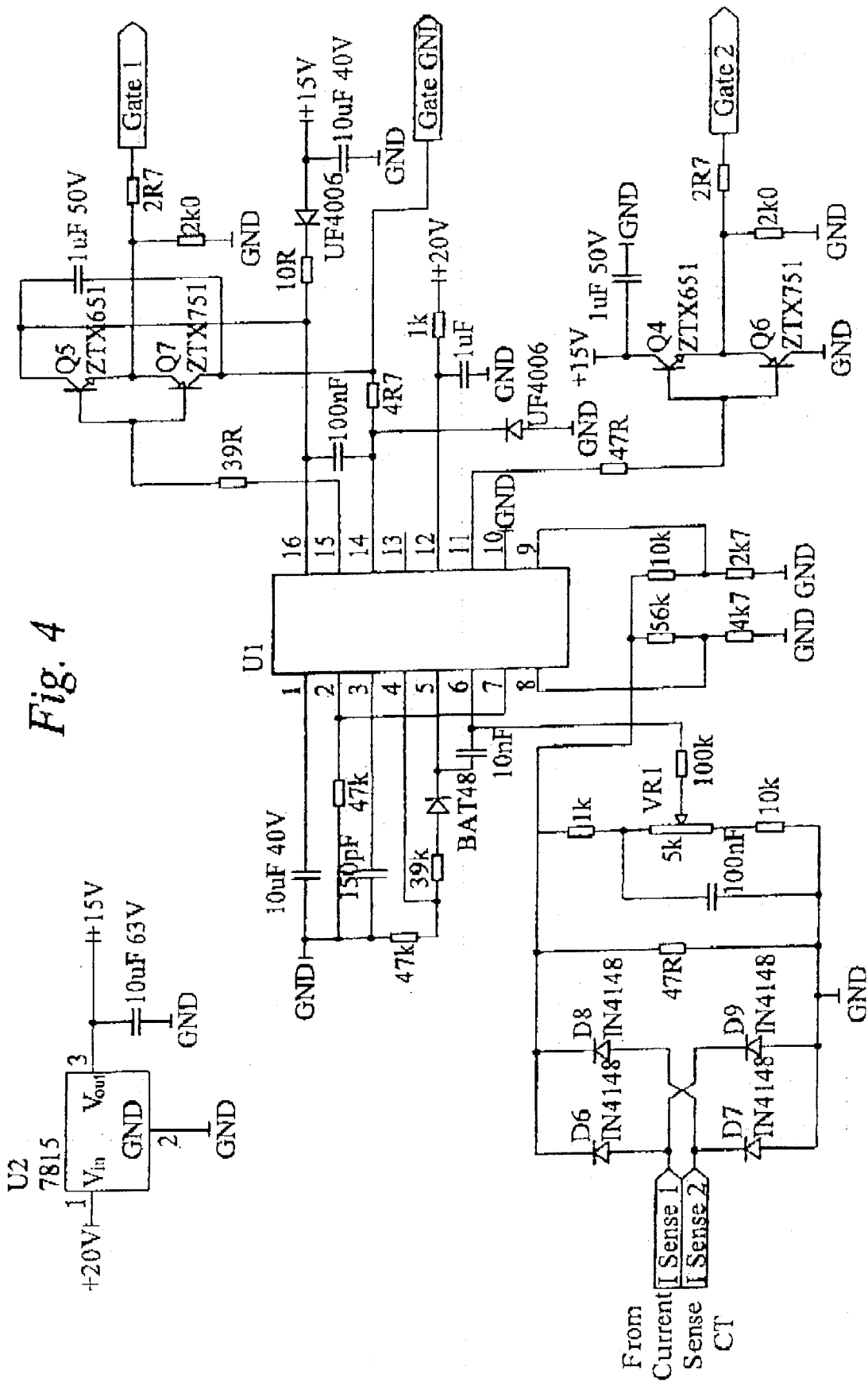
FIG. 4 is a schematic of the ballast control circuit of the preferred embodiment.
Figure 5:
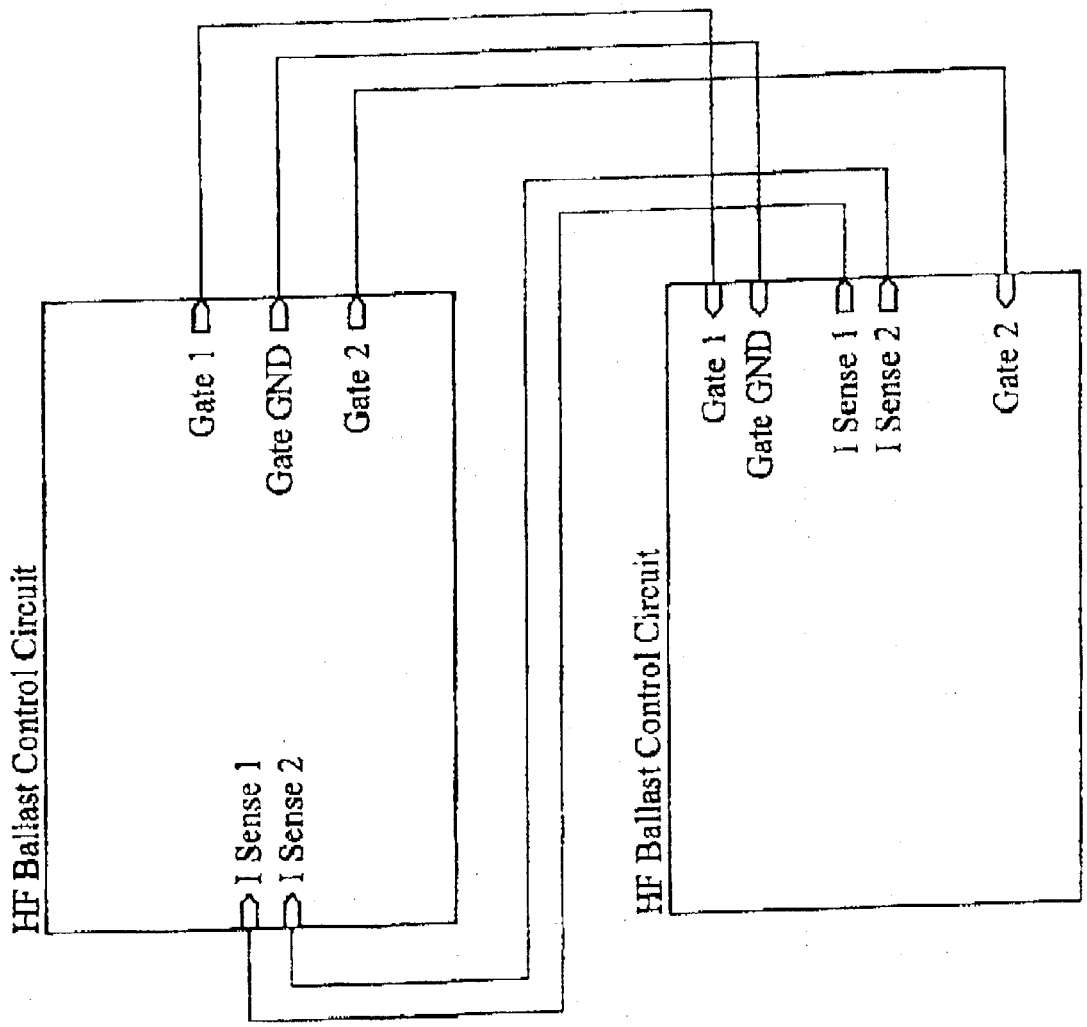
FIG. 5 illustrates connections between the control circuit and the power circuit of the preferred embodiment.
Figure 7A:
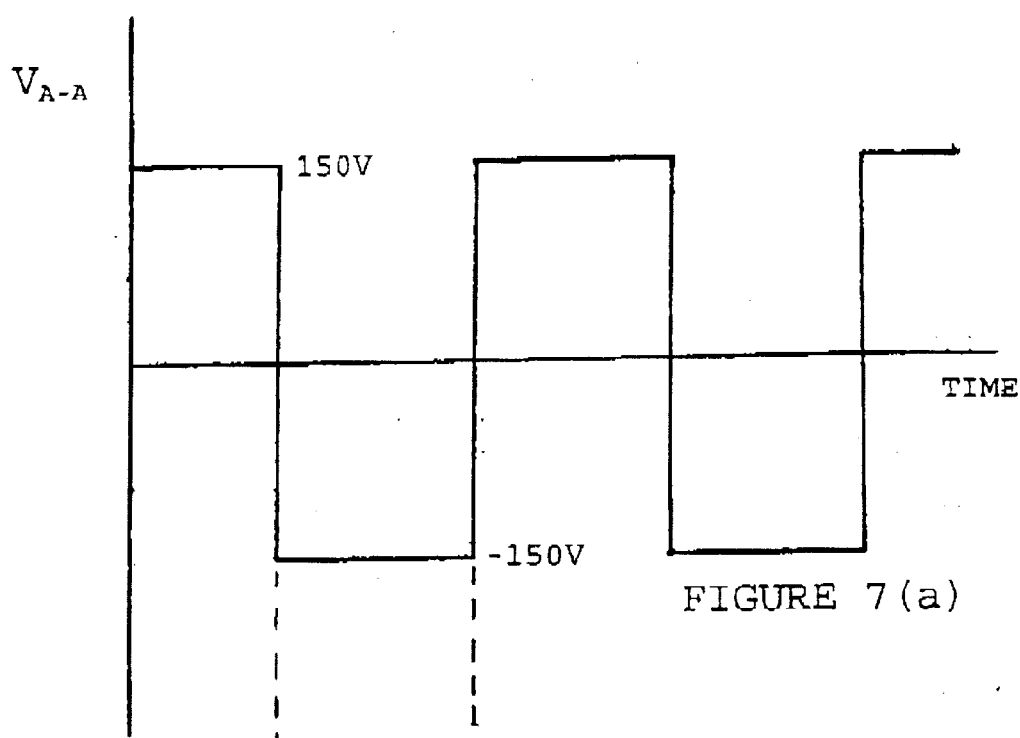
FIGS. 7(a) and 7(b) respectively illustrate voltage waveforms across the positions indicated as A—A and B—B in FIGS. 2, 3 and 6 during periods when the lamp assembly is running.

The ballast control circuit of FIG. 4 utilizes a ballast control IC chip (U1). That IC chip generates a square-wave drive which is applied to the two transistors of the half-bridge arrangement via the gate drivers which consist of transistors Q5+Q7, and Q4+Q6. The square waves are in anti-phase, in order that only one transistor conducts at any one time. The result is to produce a high-voltage square wave at point A—A in the circuit, as shown in FIG. 7(a). Control of current is achieved by varying the frequency of the square waves. If the frequency increases, then the impedance to current flow exerted by inductor 22 is increased, and vice versa. IC chip U1 measures the lamp current and makes the necessary frequency adjustments in order to maintain current flow at a fixed level. FIG. 7(c) illustrates the corresponding waveform at point B—B just prior to the start of ignition.

Figure 7B:
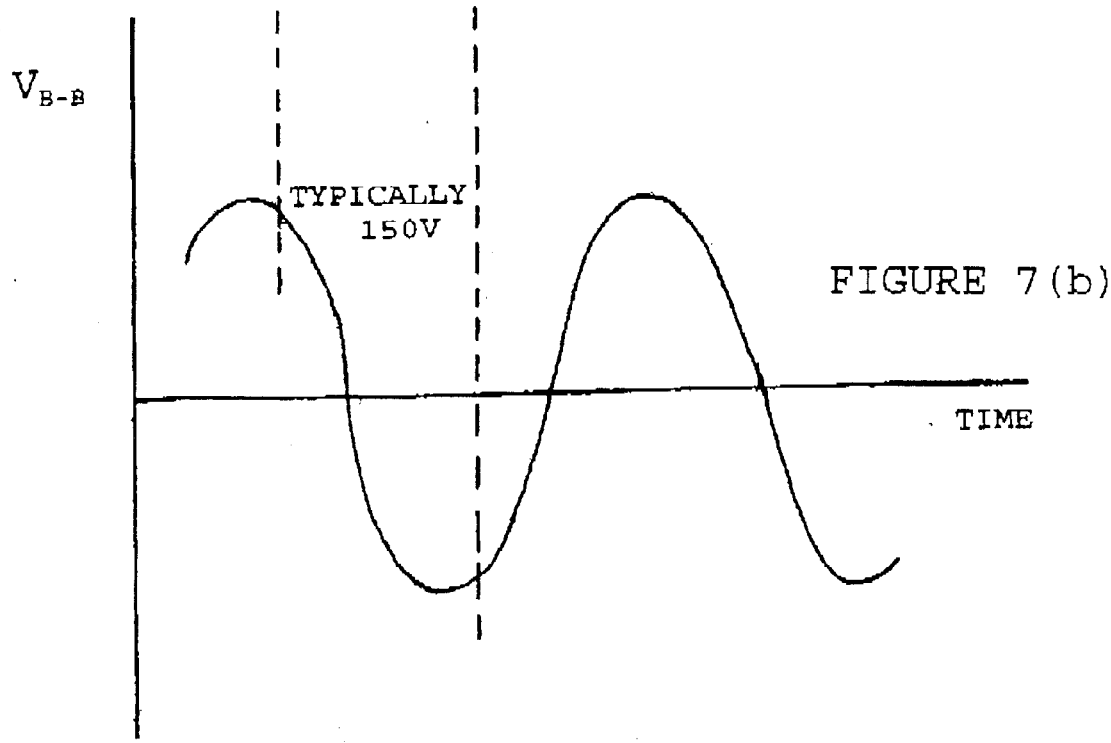
Figure 7C:
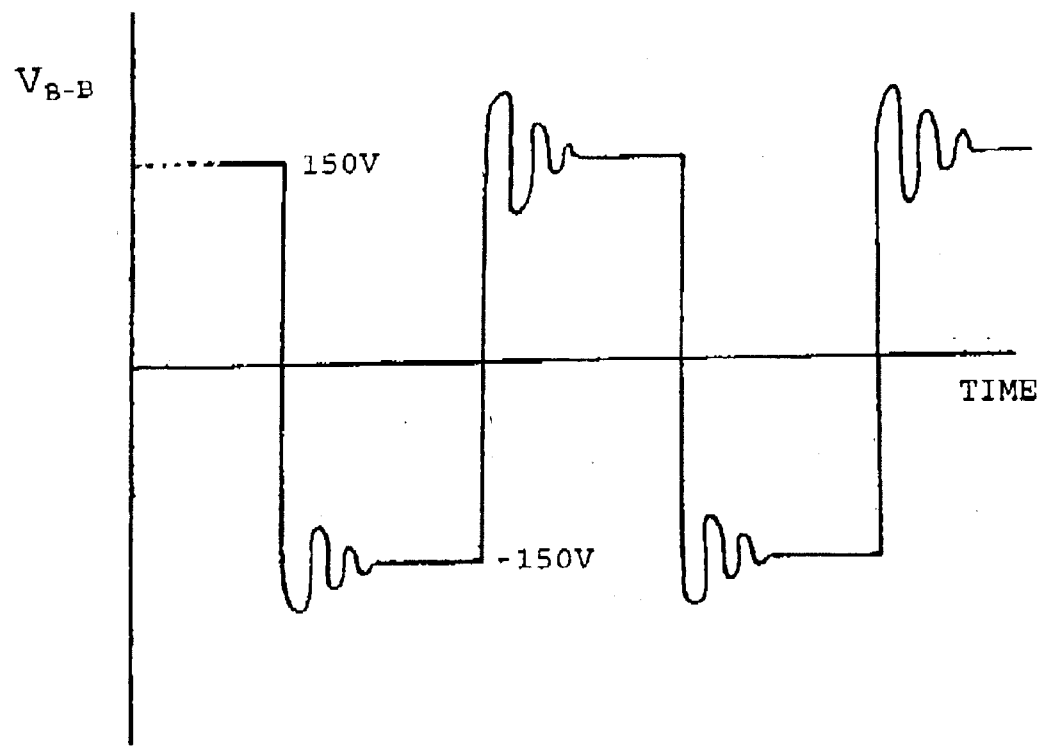
FIG. 7(c) illustrates the voltage waveform Across the position B—B in FIGS. 2, 3 and 6 just prior to the start of ignition.

The effect of the frequency-dependent impedance introduced by choke L1 results in the voltage waveform $V_{A-A}$ being shaped into the generally sinusoidal voltage waveform $V_{B-B}$ shown in FIG. 7(b). The voltage waveform $V_{B-B}$ appears across lamp 24 during steady-state conditions after ignition.

Figure 6:
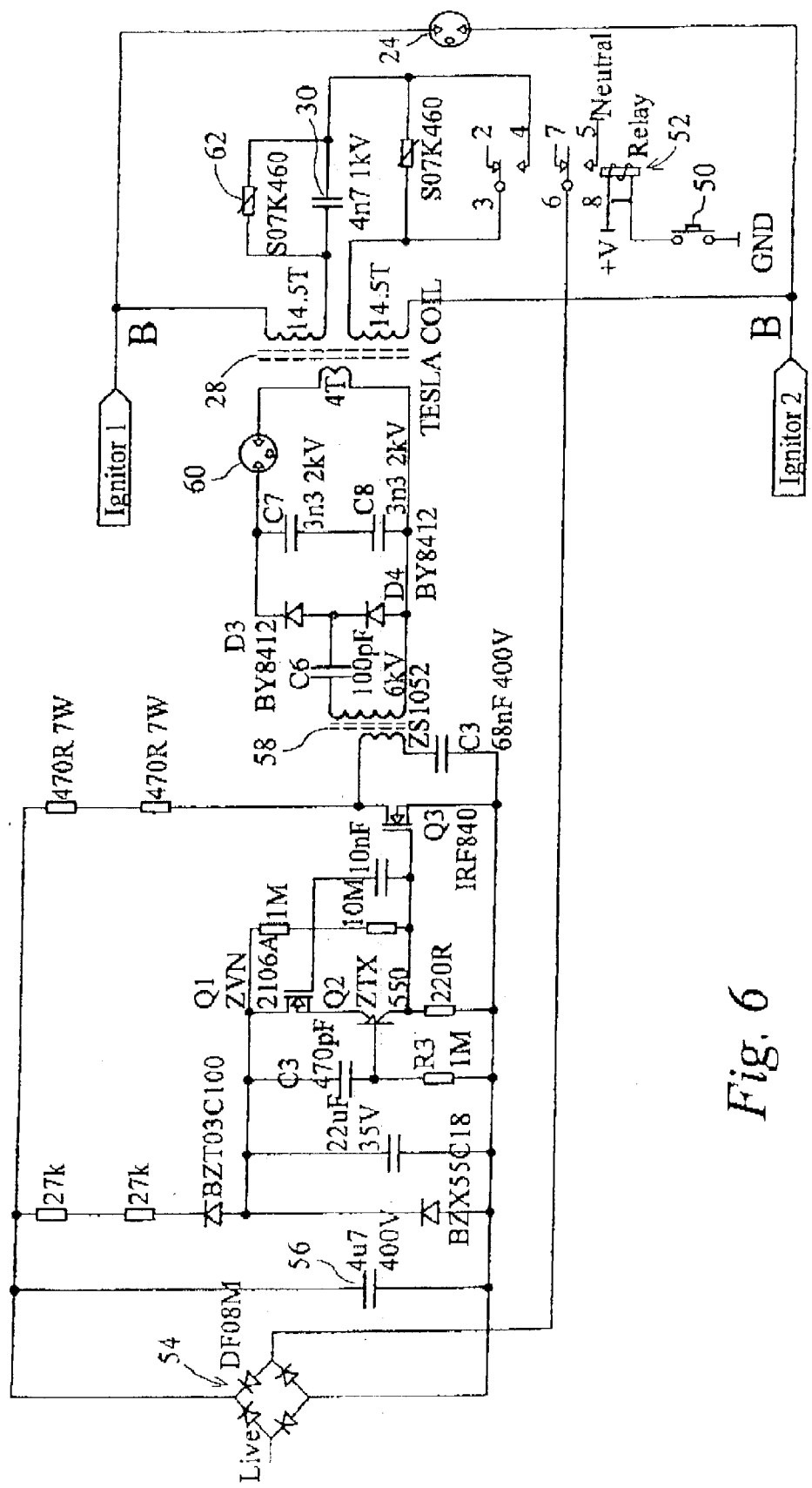
FIG. 6 is a schematic of the ignitor circuit of the preferred embodiment.

Illustrated in FIG. 6 is the ignitor circuit of the invention. This circuit produces a voltage output that, during the ignition phase of the lamp assembly, is super-imposed on the voltage output described above from the power and control circuits. During ignition the resulting voltage waveform is illustrated in FIG. 8(a).

The mains supply is connected to the two points in FIG. 6 marked LIVE and NEUTRAL. Until switch 50 is pressed, the ignitor circuit is inactive since relay 52 to which switch 50 is serially-connected disconnects the full-wave rectifier 54 from NEUTRAL.

Pressing switch 50 has two effects. Firstly, the rectifier 54 is connected to NEUTRAL. Secondly, the proximate ends of the two halves of the secondary winding of Tesla coil 28 are connected through intermediately-positioned capacitor 30. As switch 50 remains pressed, rectifier 54 and capacitor 56 produce a smoothed voltage with magnitude of around 340V. Resistor R3, capacitor C3 and transistors Q1 and Q2 constitute an oscillator which drives the gate of the large power transistor Q3. Q3 in combination with capacitor C5 apply an alternating voltage to the step-up transformer 58. Diodes D3, D4, and capacitor CE form a charge pump which is driven by the output of transformer 58. The charge pumps up the voltage on capacitors C7 and C8 until it reaches the breakover point of spark gap 60, this being typically 5 kV. At this point, the voltage across the spark gap 60 falls to a low value, allowing a resonant circuit to form consisting of capacitors C7, C8, and the primary of Tesla coil 28. The circuit resonates at a frequency of around 15 MHz with rapid amplitude decay as the energy is transferred from capacitors C7 and C8 to the secondary of the Tesla coil 28. Once the current oscillations fall below a certain magnitude, the spark gap 60 opens, allowing the capacitors C7 and C8 to begin recharging until the process repeats. The repetition frequency is approximately 0.5 kHz. Since the Tesla coil 28 has a secondary-to-primary turns ratio of (14.5+14.5)/4, the resulting voltage waveform created across the secondary windings has the shape shown in FIG. 8(b). The shape represents an ignition spike that has an amplitude of approximately 25 kv and occurs every few milliseconds. The decaying voltage waveform of the spikes has a resonant frequency of approximately 15 MHz.

Figure 1:
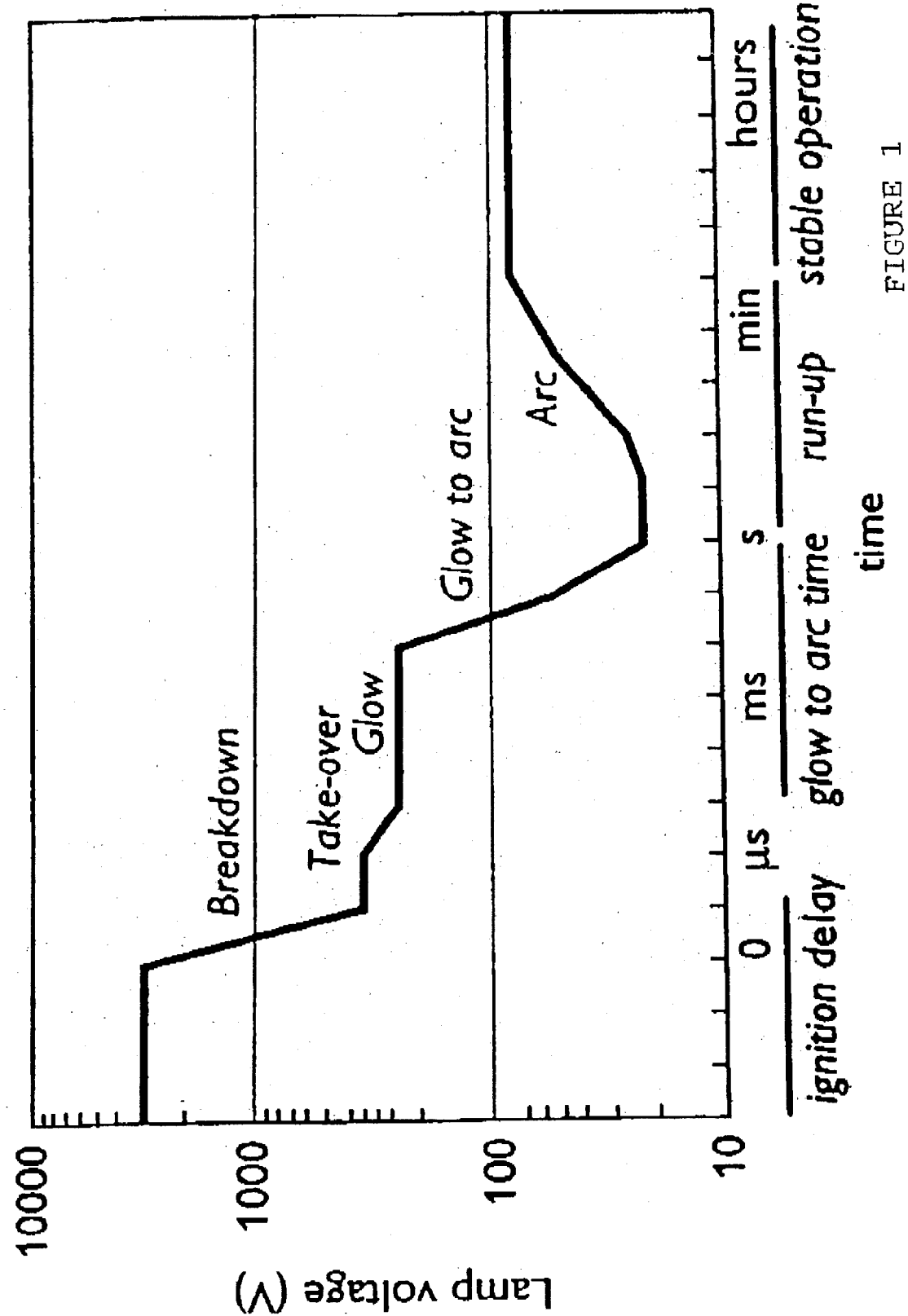
FIG. 1 is a graph illustrating variation of lamp voltage with time during the ignition phases of an HID lamp assembly.
Figure 8A:
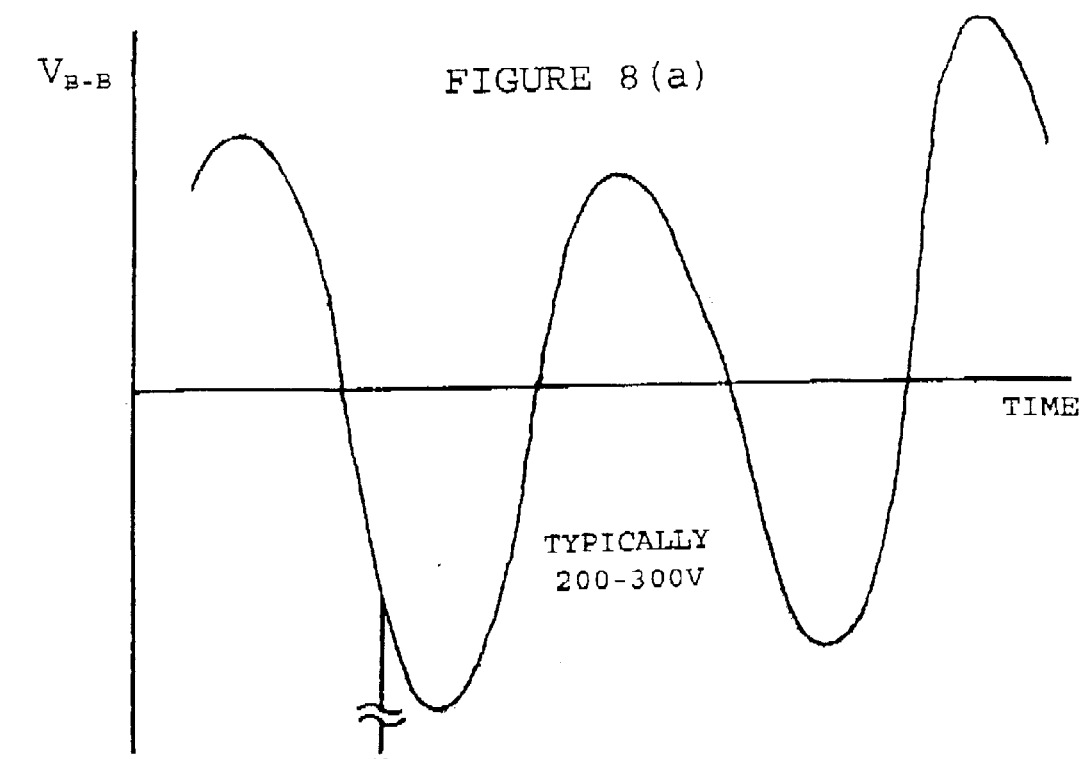
FIG. 8(a) illustrates the voltage waveform across the position B—B during an ignition period, and, FIG. 8(b) is an amplified view of one of the voltage spikes which are superimposed on an irregular sinewave waveform to define the voltage waveform across the position B—B during an ignition period.
Figure 8B:
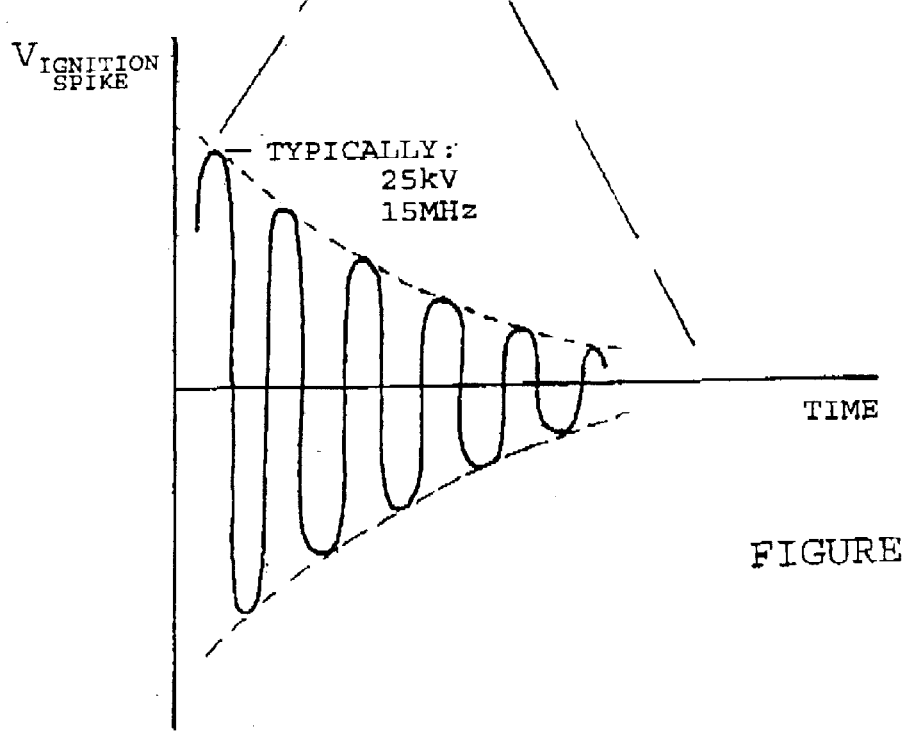

With the ignition circuit active, the waveform $V_{B-B}$ changes from the squarewave shown in FIG. 7(b) to the irregular sinewave shown in FIG. 8(a), which has an irregular amplitude typically varying within the range of 200V to 300V. This irregularity results from connecting, in parallel with the steady-state voltage waveform output by the power and control circuits, the secondary winding of the Tesla coil 28 which has the intermediate capacitor 30. The size of capacitor 30 is chosen so as to create, with the two secondary windings of Tesla coil 28, a circuit whose resonant frequency is sufficiently close to that of the steady-state voltage waveform that the steady-state voltage stimulates it. As a result, the resonant circuit produces a voltage waveform that essentially doubles that occurring under steady-state conditions. The difference between the steady-state and ignition voltages can be seen by comparing the voltage waveforms of FIGS. 7(b) and 8(a). This increased voltage is necessary to assist the lamp through "Glow Discharge" (see FIG. 1 and the earlier-cited Philips reference), during which phase the lamp current can only be maintained if the voltage is higher than the 150V used in steady-state.

A voltage-dependent resistor, or transient absorbing diode, 62 is placed in parallel with capacitor 30 to prevent that capacitor experiencing excessive voltage due to loose control of the resonant effect.

Superimposed on the irregular sinewave of FIG. 8(a) are the ignition spikes that occur every few milliseconds. Since the irregular sinewave has a frequency in the order of 300 to 400 kHz and the ignition spikes have a repetition frequency of only approximately 0.5 kHz, an ignition spike is superimposed on approximately one out of every one thousand irregular sinewaves. FIG. 8(a) illustrates an ignition spike that is superimposed on one of the irregular sinewaves. The voltage spikes have proven quite effective for producing hot-restrike ignition of HID lamps.

The ignition circuit is activated by closing ignition switch 50 for only about 0.5 seconds. Although a simple manual switch is illustrated in FIG. 6, switch 50 would in fact include a timer which would limit closing of the circuit to the 0.5 seconds.

After the lamp has been ignited, it is necessary for the ignition circuit of the invention to be quickly and effectively disconnected. If the ignition circuit were left connected in parallel with the power circuit during steady-state operation after ignition, it would form an unwanted load on the ballast. Disconnecting the ignition circuit, however, presents problems of its own. If relay contacts were placed at each end of the Tesla coil 28 and simply opened after ignition, the high ignition voltages carried on Tesla coil 28 would result in flashover within the relay. Placing the relay instead at a position intermediate of the two secondary windings of Tesla coil 28 results in the effects from those windings offsetting each other during operation of the ignitor.

While the present invention has been described in its preferred embodiment, it is to be understood that the words which have been used are words of description rather than limitation, and that changes may be made to the invention without departing from its scope as defined by the appended claims.

Each feature disclosed in this specification (which term includes the claims) and/or shown in the drawings may be incorporated in the invention independently of other disclosed and/or illustrated features.

The text of the abstract filed herewith is repeated here as part of the specification.

A hot-restrike ignition system for a high-frequency high-intensity discharge lamp assembly of the type used for location-lighting during filming includes a resonant circuit that is connectable across a lamp of the lamp assembly in parallel with a ballast circuit that is used to provide the steady-state current for the lamp assembly. The resonant circuit is temporarily energizable for producing a voltage sufficiently high for hot-restrike ignition of the lamp. The resonant circuit has two parts: a first part is formed by two sections of a secondary winding of a transformer in series with an intermediately-positioned capacitor, and a second part is formed by a serial connection of a capacitive element and a spark gap with a primary winding of the transformer. The first part provides a voltage waveform with frequency approximating the steady-state voltage frequency and amplitude sufficient when combined with the steady-state voltage to produce glow discharge, and the second part provides a voltage waveform that is lower in repetition rate but of sufficiently high voltage to initiate hot-restrike ignition in this type of lamp assembly.

What is claimed is:

1. A hot-restrike ignition system for a high-frequency high-intensity discharge lamp, comprising:
    a circuit for producing an alternating voltage for steady-state operation of the lamp; and,
    a restrike circuit for connection across the lamp and temporarily energized for producing a voltage sufficiently high for hot-restrike ignition of the lamp, the restrike circuit comprising:

a first resonant circuit for increasing the alternating voltage to an amplitude sufficient to maintain glow discharge of the lamp; and, a second resonant circuit for superimposing voltage spikes on the increased alternating voltage to a level sufficient to cause hot-restrike ignition of the lamp.

2. A hot-restrike ignition system as in claim 1, wherein the frequency of the steady-state alternating voltage is in a range of between 300 kHz and 400 kHz.

3. A hot-restrike ignition system for a high-frequency high-intensity discharge lamp, comprising:

a circuit for producing an alternating voltage for steady-state operation of the lamp; and a restrike circuit for connection across the lamp and temporarily energized for producing a voltage sufficiently high for hot-restrike ignition of the lamp, the restrike circuit comprising:

a first resonant circuit for increasing the alternating voltage to an amplitude sufficient to maintain glow discharge of the lamp, the first resonant circuit comprising, in serial connection, a pair of coils and a capacitor therebetween; and, a second resonant circuit for superimposing voltage spikes on the increased alternating voltage to a level sufficient to cause hot-restrike ignition of the lamp.

4. A hot-restrike ignition system as in claim 3, wherein the second resonant circuit comprises, in serial connection, another coil, another capacitor, and a spark gap means.

5. A hot-restrike ignition system as in claim 4, wherein the pair of coils and the capacitor form a secondary circuit of a transformer, and wherein the another coil is a primary winding of the transformer.

6. A hot-restrike ignition system as in claim 4, wherein the pair of coils and the capacitor of the first resonant circuit are a secondary circuit of a transformer, and wherein the another coil is a primary winding of the transformer.

7. A hot-restrike ignition system as in claim 6, wherein a first connection switch is positioned between one of the pair of coils and the capacitor, closing of the first connection switch energizing the first resonant circuit.

8. A hot-restrike ignition system as in claim 7, further including a ballast circuit and wherein the first resonant circuit has a resonant frequency which is approximately equal to, or is a sub-multiple or multiple of, a natural open-circuit frequency of the ballast circuit.

9. A hot-restrike ignition system as in claim 8, wherein the frequency of the steady-state alternating voltage is in a range of between 300 kHz and 400 kHz.

10. A hot-restrike ignition system as in claim 9, wherein the spark gap means discharges approximately every two milliseconds, each discharge creating a signal having an envelope of decaying voltage magnitude and a resonant frequency of approximately 15 MHz.

11. A hot-restrike ignition system as in claim 6, wherein the secondary winding of the transformer produces an alternating voltage that is additive to the steady-state alternating voltage such that a resulting total alternating voltage amplitude across the secondary winding has at least twice the voltage amplitude of the steady-state alternating voltage.

12. A hot-restrike ignition system as in claim 11, wherein the amplitude of the steady-state alternating voltage is approximately 150V, and wherein the resulting total alternating voltage amplitude is at least 300V.

13. A hot-restrike ignition system as in claim 12, wherein each voltage spike in the second resonant circuit results in a corresponding voltage spike of approximately 25 kV initial amplitude in the first resonant circuit.

14. A hot-restrike ignition system as in claim 13, wherein the restrike circuit comprises a half-bridge rectifier connected to the second resonant circuit, and wherein one node of the rectifier is connected to a supply neutral through a second connection switch when the restrike circuit is energized.

15. A hot-restrike ignition system for a high-frequency high-intensity discharge lamp, the ignition system comprising:

a restrike circuit, in parallel with a ballast circuit that produces steady-state current in the lamp, the restrike circuit comprising a transformer having a primary circuit and a secondary circuit;

the secondary circuit comprising:

a secondary winding of the transformer, the secondary winding having first and second portions with substantially equal number of turns;

a secondary capacitor positioned between the first and second portions of the secondary winding so as to be in serial connection therewith; and a first connection switch positioned between the secondary capacitor and one of the first and second portions of the secondary winding;

the primary circuit comprising:

a primary winding of the transformer, the primary winding being in serial connection with a primary capacitor and a spark gap for producing a superimposed voltage waveform on the secondary winding, the superimposed voltage waveform having a similar frequency but higher voltage than a steady-state voltage waveform existing across the secondary circuit; and, energizing circuitry for temporarily energizing the primary and secondary circuits.

16. A hot-strike ignition system as in claim 15, wherein the primary winding of the transformer is at an output of a circuit having a half-bridge rectifier at an input thereof, and wherein the rectifier is connected to a supply neutral through a second connection switch.

17. A hot-restrike ignition system as in claim 16, wherein the first and second connection switches are connected so as to open together and close together.

18. A method of hot-restrike ignition in a high-frequency high-intensity discharge lamp, comprising the steps of:

increasing via a first resonant circuit an alternating voltage used for steady-state operation of the lamp and the alternating voltage being applied across the lamp to an amplitude sufficient to maintain glow discharge of the lamp; and superimposing via a second resonant circuit voltage spikes on the increased alternating voltage sufficient to cause hot-restrike ignition of the spike.

19. A lamp assembly comprising:

a) a high frequency high intensity discharge lamp; and b) a hot-restrike ignition system comprising a circuit for producing an alternating voltage for steady state operation of the lamp; and, a restrike circuit for connection across the lamp and temporarily energized for producing a voltage sufficiently high for hot-restrike ignition of the lamp, the restrike circuit comprising:

a first resonant circuit for increasing the alternating voltage to an amplitude sufficient to maintain glow discharge of the lamp; and, a second resonant circuit for superimposing voltage spikes on the increased alternating voltage to a level sufficient to cause hot-restrike ignition of the lamp.

20. A lamp assembly comprising:
a) a high frequency high intensity discharge lamp; and
b) a hot-restrike ignition system comprising
    a restrike circuit, in parallel with a ballast circuit that produces steady-state current in the lamp, the restrike circuit comprising a transformer having a primary circuit and a secondary circuit;
    the secondary circuit comprising:
        a secondary winding of the transformer, the secondary winding having first and second portions with substantially equal number of turns;
        a secondary capacitor positioned between the first and second portions of the secondary winding so as to be in serial connection therewith; and
        a first connection switch positioned between the secondary capacitor and one of the first and second portions of the secondary winding;
    the primary circuit comprising:
        a primary winding of the transformer, the primary winding being in serial connection with a primary capacitor and a spark gap for producing a superimposed voltage waveform on the secondary winding, the superimposed voltage waveform having a similar frequency but higher voltage than a steady-state voltage waveform existing across the secondary circuit; and,
        energizing circuitry for temporarily energizing the primary and secondary circuits.

21. A lamp assembly comprising:
a) a high frequency high intensity discharge lamp; and
b) a hot-restrike ignition system comprising
    a circuit for producing an alternating voltage for steady-state operation of the lamp; and
    a restrike circuit for connection across the lamp and temporarily energized for producing a voltage sufficiently high for hot-restrike ignition of the lamp, the restrike circuit comprising:
        a first resonant circuit for increasing the alternating voltage to an amplitude sufficient to maintain glow discharge of the lamp, the first resonant circuit comprising, in serial connection, a pair of coils and a capacitor therebetween; and
        a second resonant circuit for superimposing voltage spikes on the increased alternating voltage to a level sufficient to cause hot-restrike ignition of the lamp.

* * * * *